United States Patent [19]

Tomoda

[11] Patent Number: 5,042,369
[45] Date of Patent: Aug. 27, 1991

[54] APPARATUS FOR MANUFACTURING INSTANT NOODLES

[75] Inventor: Yoshio Tomoda, Tokyo, Japan

[73] Assignee: Toyo Suisan Kaisha, Ltd., Tokyo, Japan

[21] Appl. No.: 581,278

[22] Filed: Sep. 12, 1990

Related U.S. Application Data

[62] Division of Ser. No. 387,857, Jul. 31, 1989, Pat. No. 4,988,528.

[30] Foreign Application Priority Data

Dec. 27, 1988 [JP] Japan .................. 63-329766

[51] Int. Cl.⁵ .............................. A23L 1/00
[52] U.S. Cl. ...................... 99/353; 99/483; 99/516
[58] Field of Search ............ 99/353, 355, 474, 483, 99/516; 426/557, 451, 464, 549

[56] References Cited

U.S. PATENT DOCUMENTS

| | | | |
|---|---|---|---|
| 4,515,817 | 5/1985 | Pavan | 99/353 |
| 4,619,189 | 10/1986 | Kou | 99/353 |
| 4,675,199 | 6/1987 | Hsu | 426/557 |
| 4,728,520 | 3/1988 | Yamaya et al. | 426/557 |
| 4,775,542 | 10/1988 | Manser et al. | 99/483 |
| 4,816,281 | 3/1989 | Moriyama et al. | 426/557 |

FOREIGN PATENT DOCUMENTS

| | | |
|---|---|---|
| 52-35753 | 9/1977 | Japan . |
| 60-6172 | 1/1985 | Japan . |
| 61-21055 | 1/1986 | Japan . |
| 1196389 | 6/1970 | United Kingdom . |

Primary Examiner—George Yeung
Attorney, Agent, or Firm—Frishauf, Holtz, Goodman & Woodward

[57] ABSTRACT

Instant noodles which are formed in a block of a plurality of noodles having a plurality of indented portions in the longitudinal direction and separate at the indented portions into short noodles upon cooking in a cooking pot containing boiling water.

1 Claim, 4 Drawing Sheets

APPARATUS FOR MANUFACTURING INSTANT NOODLES

This is a division of Ser. No. 387,857, filed July 31, 1989, now U.S. Pat. No. 4,988,528.

BACKGROUND OF THE INVENTION

1. Field of the Invention

The present invention relates to instant noodles, a method for manufacturing the instant noodles, an apparatus for manufacturing the instant noodles and, more particularly, to instant noodles to be cooked in a cooking pot containing boiling water or the like and served, a method for manufacturing the instant noodles, and an apparatus for manufacturing the instant noodles.

2. Description of the Related Art

Conventional instant noodles of this type, e.g., fried noodles, are manufactured as follows. A dough is formed into a strip by multistage rolls. The strip is linearly cut in its longitudinal direction to form raw noodles. The raw noodles are divided into a plurality of rows in the direction of travel and waved so as to vertically overlap each other. The waved raw noodles are steamed in a steam chamber to which steam is supplied. The steamed raw noodle groups are cut into desired lengths, then put into predetermined frames and fried to manufacture the fried noodles.

The fried noodles manufactured as described above are a block of a plurality of raw noodles each having a length of about 450 mm. These fried noodle are put into a cooking pot containing boiling water or the like and cooked for several minutes before serving. Since the raw noodles are long, the fried noodles must be served with chopsticks. When noodles are served with chopsticks, however, a sipping noise is made which may be uncomfortable for others.

For this reason, a demand has arisen for instant noodles such as fried noodles which consist of short raw noodles and therefore can be eaten with a spoon or fork whereby uncomfortable sipping noises are not made. Such fried noodles can be manufactured as follows. That is, raw noodle groups extracted from the steam chamber in the above fried noodle manufacturing steps are cut into a shorter length than that of conventional fried noodles, put into predetermined frames, and fried to manufacture block-like fried noodles. In order to manufacture fried raw noodles having a length ⅓ that of the conventional block-like fried noodles according to the above method, however, three fried noodles blocks must be packed into a single bag to obtain the same size as that of the conventional packed fried noodles in terms of an outer appearance. For this reason, as compared with the conventional fried noodle manufacturing method, frying and packing steps are tripled, significantly degrading productivity.

In the field of non-instant noodles, hand-made raw noodles having a plurality of undulations formed at small pitches are known (Japanese Published Examined Patent Application No. 52-35753). The plurality of undulations of the raw noodles provide a specific feature of noodles when the noodles are eaten.

SUMMARY OF THE INVENTION

It is an object of the present invention to provide instant noodles which easily separate, at indented portions formed on the noodles, into short noodles upon cooking in a cooking pot with boiling water, or the like, and can be served with a spoon or fork with which uncomfortable sipping noises may not be made.

It is another object of the present invention to provide a block of instant noodles which retains its shape upon being packed and stacked on a display shelf in a store. It is still another object of the present invention to provide a method capable of manufacturing the instant noodles by simple steps, without largely changing conventional manufacturing steps.

It is still another object of the present invention to provide an apparatus capable of manufacturing the instant noodles without largely changing a conventional manufacturing installation.

According to the present invention, there are provided instant noodles comprising elongated noodles having a plurality of portions throughout a longitudinal or length direction thereof such that said elongated noodles are separable at said indented portions into respective shorter noodles upon cooking thereof.

According to the present invention, there is provided an apparatus for manufacturing instant noodles, comprising:

means for forming dough into a strip;

indented portion forming means for forming a plurality of indented portions throughout a widthwise direction in a longitudinal direction thereof;

means for linearly cutting the strip having the plurality of indented portions in the direction of travel to form raw noodles;

means for dividing the raw noodles into a plurality of rows in the direction of travel and waving the raw noodles so that the raw noodles vertically overlap each other;

means for steaming the waved raw noodles; and means for cutting the steamed raw noodle groups to a desired length.

DETAILED DESCRIPTION OF THE PREFERRED EMBODIMENTS

Figure 1:
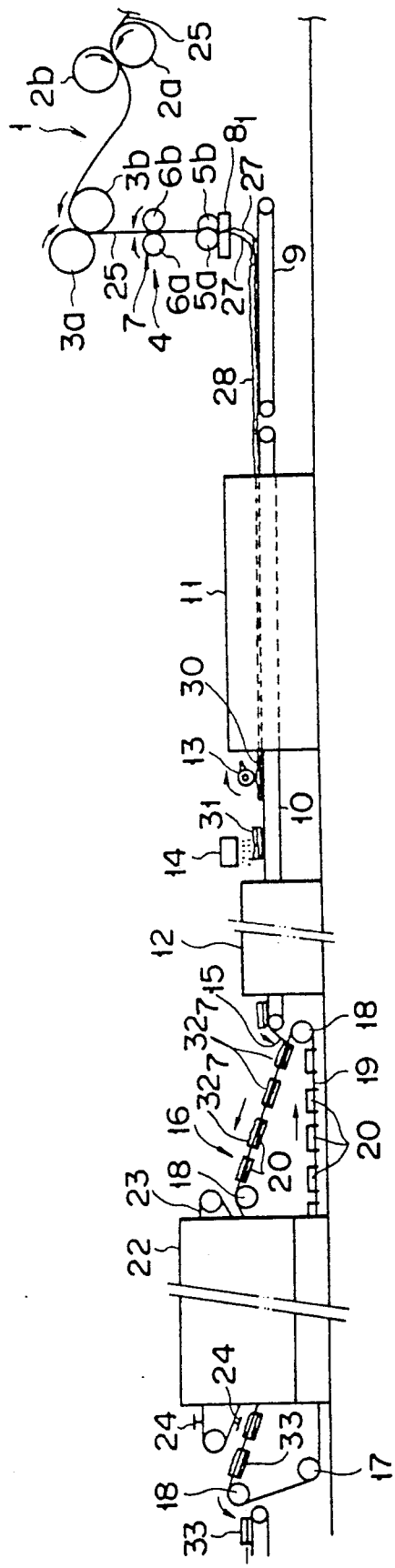
FIG. 1 is a front view showing an apparatus for manufacturing fried instant noodles according to Example 1.

Instant noodles of the present invention include elongated noodles having a plurality of indented portions in the longitudinal lengthwise direction thereof.

The thickness of each indented portion (thickness of a remaining noodle) preferably falls within the range of 0.2 to 0.6 mm. This is because when the thickness of the indented portion is less than 0.2 mm, a strip may separate at the indented portions after the indented portions are formed on the strip upon manufacture. When the thickness of the indented portion exceeds 0.6 mm, it is difficult for the noodles to separate at the indented portions upon cooking in a cooking pot with boiling water or the like.

Although the interval between the plurality of indented portions formed on noodles depends on how the noodles are to be served, it normally falls within the range of 70 to 150 mm.

The instant noodles of the present invention are a block including a plurality of noodles and put into a bag.

A method for manufacturing instant noodles according to the present invention, comprises the steps of:

forming dough into a strip;

forming a plurality of indented portions throughout a widthwise direction of the strip along a longitudinal direction thereof;

linearly cutting the strip having the plurality of indented portions in the direction of travel into raw noodles;

dividing the raw noodles into a plurality of rows in the direction of travel and waving the raw noodles so that the raw noodles vertically overlap each other;

steaming the waved raw noodles; and cutting the steamed raw noodle groups to a desired length.

The thickness of each indented portion (thickness of a remaining strip) preferably falls within the range of 0.2 to 0.6 mm. This is because when the thickness of the indented portion is less than 0.2 mm, the strip may separate at the indented portions after the indented portions are formed on the strip upon manufacture. When the thickness of the indented portion exceeds 0.6 mm, it is difficult for the noodles to separate at the indented portions when the instant noodles as a final product is cooked in a cooking pot with boiling water or the like.

Although the interval between the plurality of indented portions formed on noodles depends on how the noodles are to be served, it normally falls within the range of 70 to 150 mm.

The noodle groups are preferably cut into a straight length of 400 to 500 mm.

Since the instant noodles according to the present invention includes noodles having a plurality of indented portions in the longitudinal direction, they can easily separate into short noodles at the indented portions of the noodles upon cooking in a cooking pot or the like with boiling water. As a result, the instant noodles can be served with a spoon, a fork, or the like whereby uncomfortable sipping noises may not be made upon eating unlike the case of chopsticks. In addition, each noodle having the plurality of indented portions in the longitudinal direction has the same strength as that of the conventional long noodle. Therefore, when a plurality of noodles are grouped into a block and packed, the shape of the block can be sufficiently retained. As a result, since deformation of the instant noodles can be prevented when they are stacked on a display shelf in a store, the packed instant noodles retain a high commercial value.

In addition, according to the method of the present invention, a plurality of indented portions in the longitudinal direction are formed simultaneously throughout the widthwise direction when the noodles are in the form of a strip. Therefore, the instant noodles can be manufactured in a mass-production manner without largely changing the conventional manufacturing steps.

Furthermore, according to the manufacturing apparatus of the present invention, the instant noodles can be easily manufactured in a mass-production manner without changing the design of a conventional manufacturing apparatus.

DESCRIPTION OF THE EMBODIMENT

Embodiments of the present invention will be described in detail below.

EXAMPLE 1

Figure 2:
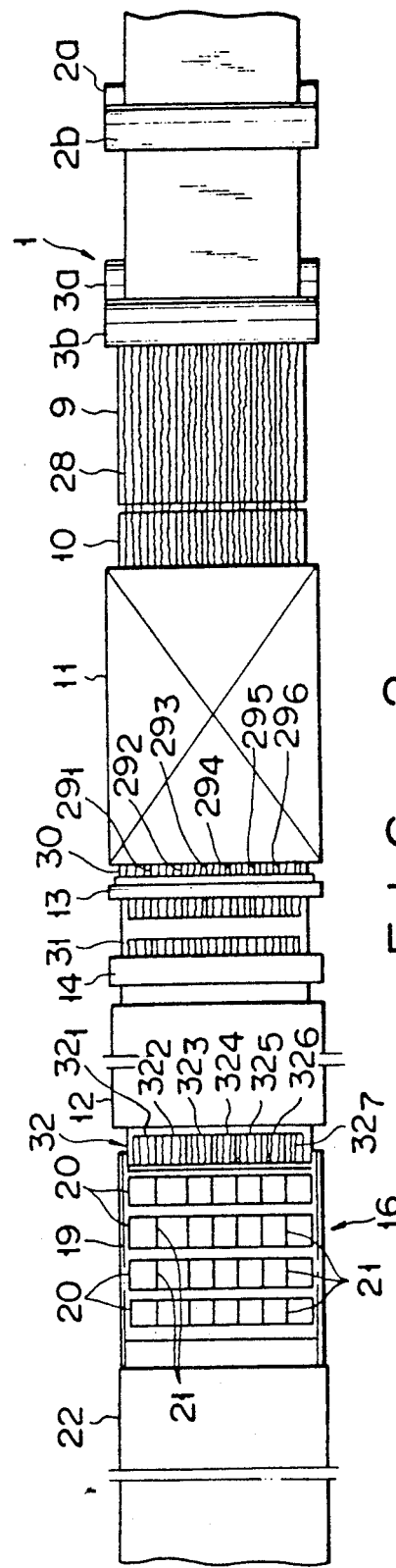
FIG. 2 is a plan view showing a manufacturing apparatus shown in FIG. 1.

As shown in FIGS. 1 and 2, a multistage roll noodle apparatus 1 is a means for forming a dough into a strip. The noodle apparatus 1 comprises a plurality of rough finishing rolls 2a and 2b for forming a dough supplied 3b having a diameter of 120 mm. An indented portion forming means 4 and a pair of cutter rolls 5a and 5b as a means for linearly cutting the strip in the direction of travel of the strip are sequentially arranged after (below) the finishing rolls 3a and 3b.

Figure 3:
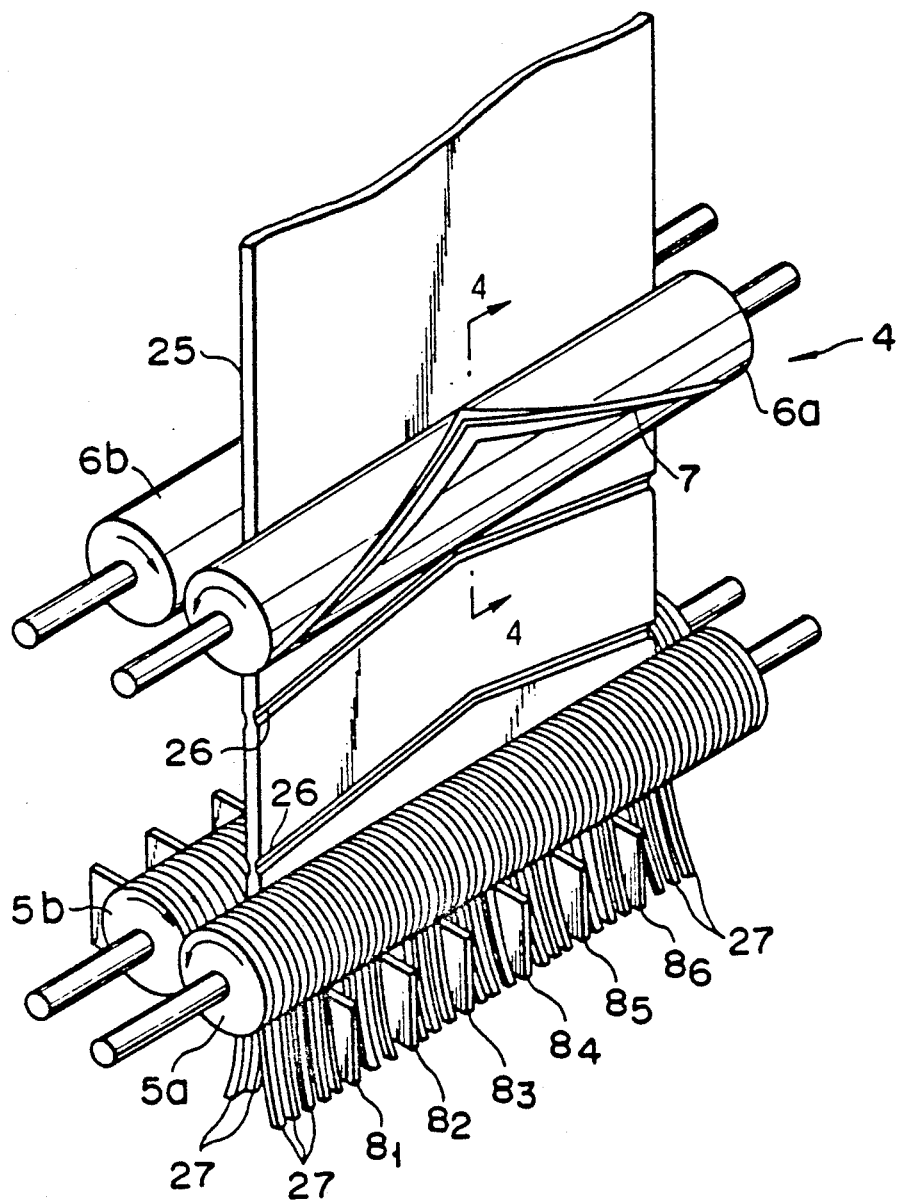
FIG. 3 is a perspective view showing a manufacturing apparatus shown in FIG. 1.
Figure 4:
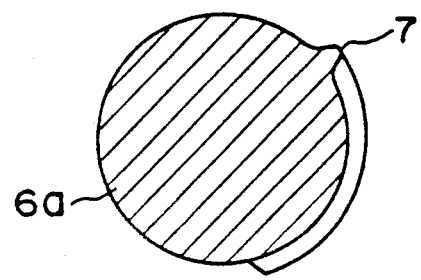
FIG. 4 is a sectional view of the rolls shown in FIG. 3 taken along line 4—4 thereof.

The indented portion forming means 4 comprises a pair of rolls 6a and 6b, having a diameter of 42 mm and arranged with an interval of 2.8 mm therebetween, for rotating in a direction indicated by an arrow as shown in FIG. 3. As shown in FIGS. 3 and 4, a 2.5 mm high, 2.5 mm wide rib 7 is formed on the outer surface of the roll 6a so as to form a curve from the central portion toward both the ends of the roll 6a throughout a circumferential angle of 120° in a direction opposite to a rotation direction of the roll 6a. As shown in FIG. 3, six partitions $8_1$ to $8_6$ are arranged below the cutter rolls 5a and 5b and divide noodles cut by the cutter rolls 5a and 5b into a plurality of (e.g., seven) rows in the direction of travel.

A first net conveyor 9 is located below the partitions $8_1$ to $8_6$ and rotates at a lower speed than the speed of the noodles fed through the cutter rolls 5a and 5b. A second net conveyor 10 for rotating at the same speed as that of the net conveyor 9 is located after the net conveyor 9. The net conveyor 10 is located across a steam chamber 11 and an elongated food tunnel 12 arranged with a predetermined interval therebetween. Steam is supplied to the steam chamber 11, and a heating gas is supplied to the food tunnel 12. A noodle cutter 13 is arranged above a portion of the second net conveyor 10 located near the exit of the steam chamber 11. The noodle cutter 13 is rotated at the same speed as the feed speed of the net conveyor 10 and cuts the steamed divided noodle groups into a desired length in the widthwise direction. A folding member (not shown) for folding the noodle groups cut into the product size length into two is located after the cutter 13. A spray 14 for spraying a seasoning solution is arranged above a portion of the second net conveyor 10 located near the entrance of the food tunnel 12.

A chute 15 is located at a supply end of the second net conveyor 10. A retainer conveyor 16 is arranged after the chute 15. The retainer conveyor 16 comprises a conveyor chain 19 looped between a driving sprocket 17 and a driven sprocket 18 and a plurality of frames 20, mounted on the conveyor chain 19 with predetermined intervals therebetween, for receiving the seasoned divided noodles dropped from the chute 15. Each frame 20 has a transversely elongated box structure in which the interior is divided into, e.g., seven sections by partitions 21. A plurality of holes for receiving/discharging oil are formed in a bottom portion of each frame 20. The retainer conveyor 16 is located across a fryer 22. The plurality of frames 20 having the seasoned divided noodles are moved into a heating oil tank (not shown) of the fryer 22 to perform frying. The fryer 22 includes a cover conveyor 23 driven in synchronism with the retainer conveyor 16 and having a plurality of oil submerge covers 24. The cover conveyor 23 causes the covers 24 to cover opening portions of the frames 20 passing through the heating oil tank of the fryer 22, thereby preventing floating or flowing of the divided noodles in the frames 20 upon frying.

A method of manufacturing fried instant noodles will be described below with reference to the above manufacturing apparatus.

Dough supplied from the feeder (not shown) is sequentially fed to the plurality of rough finishing rolls 2a and 2b and the finishing rolls 3a and 3b rotated at, e.g., 44 rpm of the multistage noodle apparatus 1 to form a 1.1 mm thick strip 25. Subsequently, the strip 25 is fed to the indented portion forming means 4 including the rolls 6a and 6b having a roll interval of 2.8 mm and a rotational speed of 140 rpm. Since the roll 6a of the means 4 has the 2.5 mm high, 2.5 mm wide rib 7 on its outer surface as shown in FIGS. 3 and 4, a plurality of indented portions 26 leaving a remaining noodle thickness of 0.5 mm are formed along the widthwise direction of the strip 25 at intervals of 90 mm in the longitudinal direction. Upon formation of the indented portions 26 on the strip 25 by the rolls 6a and 6b, since the rib 7 is formed on the outer surface of the roll 6a so as to form a curve from the central portion toward both the ends of the roll 6a in a direction opposite to the rotation direction of the roll 6a, the indented portion 26 can be formed while the strip 25 is not offset to the ends of the rolls 6a and 6b or moved in a zigzag direction.

The strip 25 having the indented portions 26 is fed to the cutter rolls 5a and 5b rotating at 135 rpm and linearly cut to form noodles 27. Upon cutting, the noodles 27 are supplied downward from a contact point between the cutter rolls 5a and 5b in left and right directions by the cutting effect of the rolls 5a and 5b. The noodles 27 are divided into seven rows in the direction of travel by the six partitions $8_1$ to $8_6$ arranged below the cutter rolls 5a and 5b. The divided noodles 27 are moved onto the first net conveyor 9 moving at a lower speed than the feed speed of the noodles 27 so as to vertically overlap each other and be waved.

Figure 5:
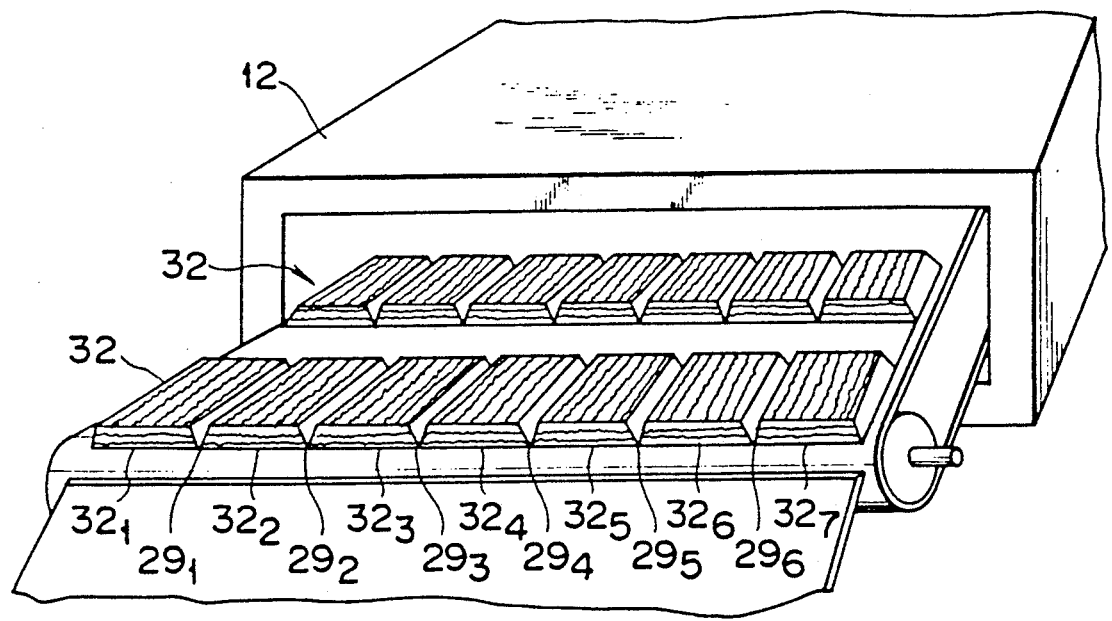
FIG. 5 is a perspective view showing the exit of the food tunnel of the manufacturing apparatus shown in FIG. 1.

Waved noodles 28 are conveyed to the steam chamber 11 by the first and second net conveyors 9 and 10 and steamed with injected steam. The noodles 28 supplied from the steam chamber 11 are separated into noodle groups 30 by noodle dividing sections $29_1$ to $29_6$. The noodle groups 30 are cut into a length of about 300 mm (straight length=about 450 mm) in the widthwise direction by the rotating noodle cutter 13 and folded into two by the folding member (not shown), thereby forming folded noodle groups 31. The noodle groups 31 are sprayed with a seasoning solution by the spray 14 and conveyed in the food tunnel 12. Upon this conveyance, the seasoning solution permeates into the noodle groups 31. Seasoned noodle groups 32, conveyed to the supply end position of the second net conveyor 10, are dropped from the chute 15 onto the retainer conveyor 16 moving below the chute 15 as shown FIG. 5. Since the retainer conveyor 16 has the frames 20 each divided into seven sections by the partitions 21, the seasoned noodle groups 32 are supplied as divided noodles $32_1$ to $32_7$ one after another in the frames 20.

The divided noodles $32_1$ to $32_7$ in the frames 20 are supplied to the heating oil tank in the fryer 22 upon rotation of the retainer conveyor 16 and fried therein to manufacture fried noodles 33. The fried noodles 33 are then conveyed to a packing step by a conveying means, such as a conveyor, and packed.

Figure 6:
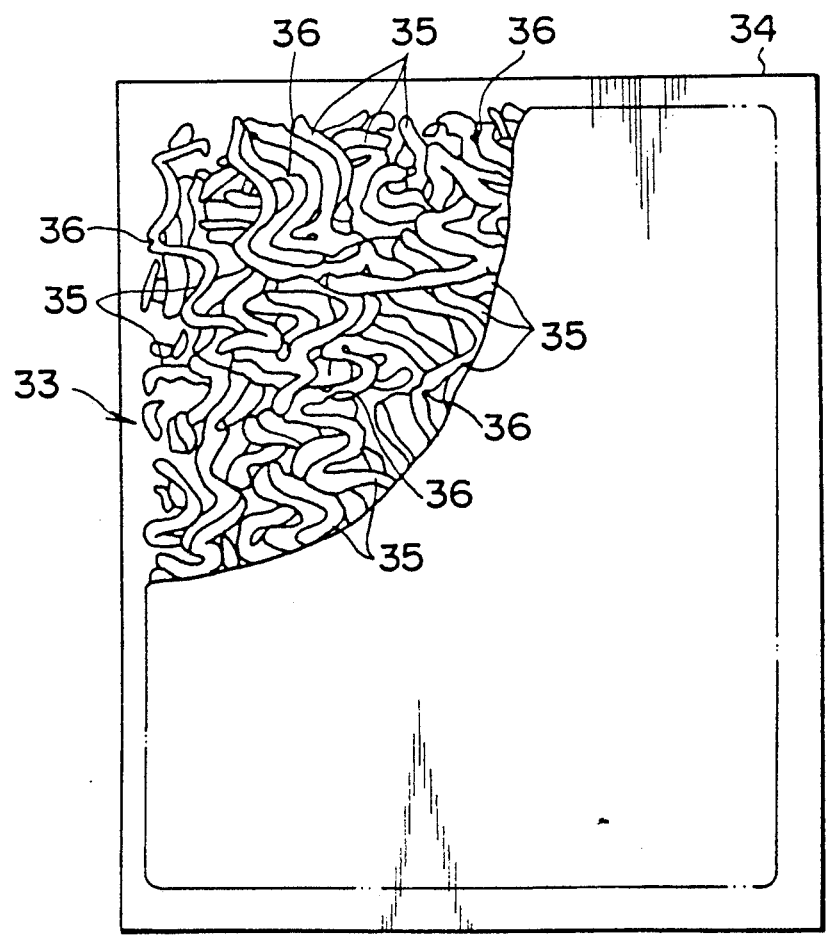
FIG. 6 is a plan view showing packed fried instant noodles manufactured in accordance with Example 1.

FIG. 6 shows packed fried noodles obtained by packing the fried noodles 33 into a bag 34. The fried noodles 33 are a block of a plurality of noodles 35 having a length of about 450 mm, and each noodle 35 has a plurality of indented portions 36 having a remaining noodle thickness of about 0.5 mm and formed at intervals of 90 mm in the longitudinal direction. The fried noodles 33 were removed from the bag 34, put into a cooking pot containing boiling water, and cooked for several minutes (e.g., five minutes). As a result, all the noodles 35 separated at the indented portions 36 into short noodles having a length of 90 mm and therefore could be served with a spoon, a fork, or the like with which uncomfortable sipping noise will not be made upon eating unlike the case of chopsticks. When the fried noodles shown in FIG. 6 were displayed in a store, the fried noodles 33 in the bag 34 could retain their shape as a conventional packed fried noodles (a block of noodles having a length of about 450 mm), and no deformation or the like which degraded the commercial value occurred.

In the process illustrated in FIG. 1, when the noodle strip 25 is supplied to and cut by the cutter rolls 5a and 5b located below the indented portion forming means 4 after the indented portions 26 are formed on the strip 25 by the forming means 4, a tensile force was applied on the strip 25. However, the strip 25 did not separate at the indented portions 26 by the tensile force but was linearly cut by the cutter rolls 5a and 5b, thereby continuously forming the noodles 27.

In addition, according to the manufacturing apparatus shown in FIGS. 1 to 5, without largely changing the design of the conventional manufacturing installation, the fried noodles can be manufactured by only additionally providing the indented portion forming means 4 before the cutter rolls 5a and 5b for linearly cutting the strip 25 into the noodles 27.

Control 1

When the indented portions were formed on the strip by the indented portion forming means 4, the remaining strip thickness of the indented portions was set to be 0.1 mm. When a tensile force was applied on this strip while the strip was supplied to and cut by the cutter rolls 5a and 5b, the strip separated at the indented portions and therefore could not be continuously, linearly cut by the cutter rolls 5a and 5b.

Control 2

When the indented portions were formed on the strip by the indented portion forming means 4, the remaining strip thickness of the indented portions was set to be 0.7 mm. Even when a tensile force was applied on this strip while the strip was supplied to and cut by the cutter rolls 5a and 5b, the strip did not separate at the indented portions. As a result, fried noodles could be manufactured following the same procedures as in Example 1. The manufactured fried noodles were put into a cooking pot containing boiling water and cooked for several minutes (e.g., five minutes). As a result, the fried noodles rarely separated at the indented portions to result in noodles having an initial product size length (450 mm) and therefore could not be served with a spoon, a fork, or the like.

EXAMPLE 2

Figure 7:
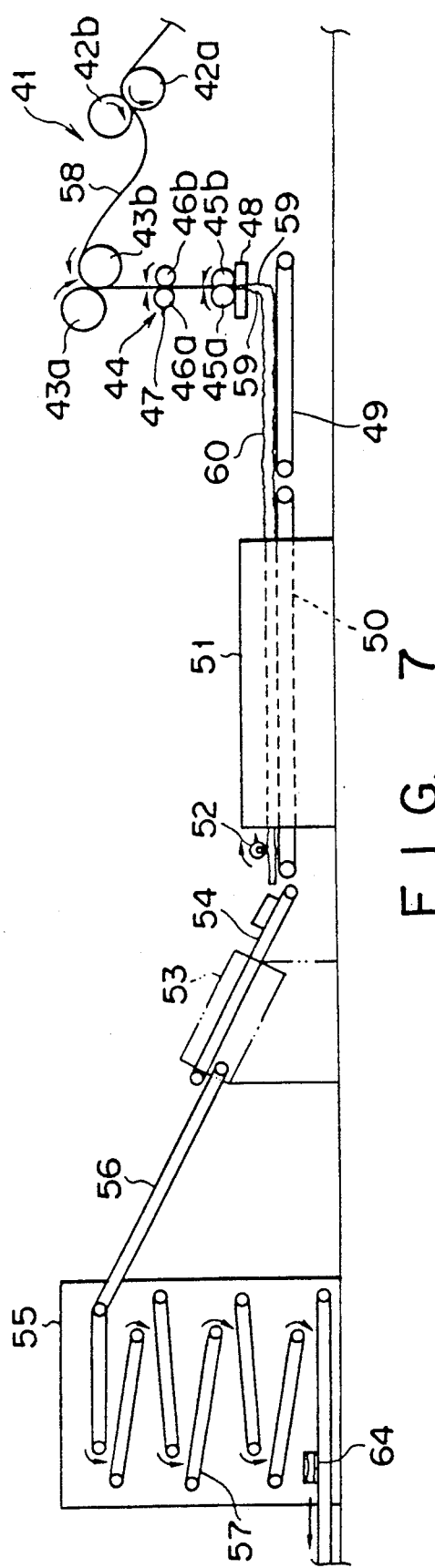
FIG. 7 is a front view showing an apparatus for manufacturing dry noodles according to Example 2.
Figure 8:
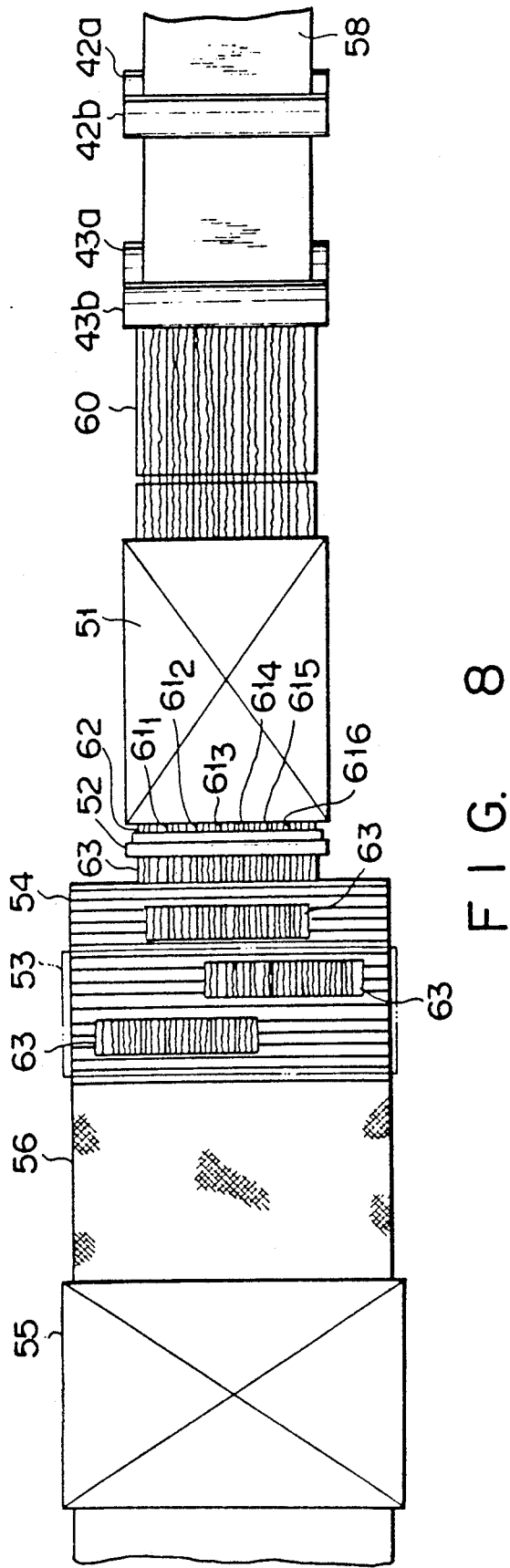
FIG. 8 is a plan view showing the manufacturing apparatus shown in FIG. 7.

As shown in FIGS. 7 and 8, a multistage roll noodle apparatus 41 is a means for forming dough into a strip. The noodle apparatus 41 comprises a plurality of rough finishing rolls 42a and 42b for forming dough supplied from a feeder into a strip and finishing rolls 43a and 43b having a diameter of 120 mm. An indented portion forming means 44 and a pair of cutter rolls 45a and 45b as a means for linearly cutting the strip in the longitudinal direction are sequentially arranged after (below) the finishing rolls 43a and 43b.

The indented portion forming means 44 comprises a pair of rolls 46a and 46b, having a diameter of 42 mm and arranged with an interval of 28 mm therebetween, for rotating in the direction indicated by an arrow in FIG. 3. A 2.2 mm high, 2.5 mm wide rib 47 is formed on the outer surface of the roll 46a so as to form a curve from the central portion toward both the ends of the roll 46a throughout a circumferential angle of 120° in a direction opposite to the rotation direction of the roll 46a. Six partitions 48 for dividing the strip cut by the cutter rolls 45a and 45b into a plurality of (e.g., seven) rows in the direction of travel are arranged below the cutter rolls 45a and 45b.

A first net conveyor 49 is located below the partitions and rotates at a lower speed than the speed of the noodles fed through the cutter rolls 45a and 45b. A second net conveyor 50 is located after the first net conveyor 49 and rotates at the same speed as that of the net conveyor 49. The net conveyor 50 is located across a steam chamber 51 arranged with a predetermined interval therebetween. Steam is supplied to the steam chamber 51. A noodle cutter 52 is arranged above a portion of the second net conveyor 50 located near the exit of the steam chamber 51. The noodle cutter 52 is rotated at the same speed as the feed speed of the second net conveyor 50 to cut the steamed and divided noodle groups into a desired length in the widthwise direction. A member (not shown) for folding the noodle groups, cut into a product size length, into two is located after the cutter 52.

A selector conveyor 54 is located at the supply end of the second net conveyor 50. The selector conveyor 54 includes a selector mechanism 53 for selecting the path of the noodle groups cut into the size length to the right and left. A conveyor 56 for conveying the path-selected noodle groups to a vertical dryer 55 is located after the selector conveyor 54. A multistage net conveyor 57 for sequentially turning and drying the noodle groups is located in the dryer 55.

A method of manufacturing dry noodles will be described below with reference to the above manufacturing method.

Dough supplied from the feeder (not shown) is sequentially fed to the plurality of rough finishing rolls 42a and 42b and finishing rolls 43a and 43b rotated at, e.g., 44 rpm of the multistage noodle apparatus 41 and formed into a 1.1 mm thick strip 58. Subsequently, the strip 58 is fed to the indented portion forming means 44 having the rolls 46a and 46b arranged at a roll interval of 2.8 mm and rotated at a rotational speed of 140 rpm. Since the 2.5 mm high, 2.5 mm wide rib 47 is formed on the outer surface of the roll 46a of the indented portion forming means 44 as shown in FIGS. 3 and 4, a plurality of indented portions (not shown) having a remaining noodle thickness of 0.5 mm are formed in the widthwise direction of the strip 58 at intervals of 90 mm in the longitudinal direction while the strip 58 passes through the rolls 46a and 46b. Upon formation of the indented portions on the strip 58 by the rolls 46a and 46b, since the rib 47 is formed on the outer surface of the roll 46a so as to form a curve from the central portion toward both ends of the roll 46a in the direction opposite to the rotation direction of the roll 46a, the indented portions can be formed while the strip 58 is not offset toward the ends of the rolls 46a and 46b or moving in a zigzag direction.

The strip 58 having the indented portions is fed to and linearly cut by the cutter rolls 45a and 45b, rotated at 135 rpm, to form noodles 59. Upon cutting, the noodles 59 are supplied downward from a contact point between the cutter rolls 45a and 45b as the center to the right and left by the cutting effect of the rolls 45a and 45b. The noodles 59 are then divided into seven rows in the direction of travel by the six partitions 48 arranged below the cutter rolls 45a and 45b, moved onto the first net conveyor 49 moving at a lower speed than the feed speed of the divided noodles 59, and vertically overlapped and waved thereon.

Waved noodles 60 are conveyed to the steam chamber 51 by the first and second net conveyors 49 and 50 and steamed with steam injected therein. The steam chamber 51 supplies noodle groups 62 adhered by noodle dividing sections $61_1$ to $61_6$. The noodle groups 62 are cut into a length of about 300 mm (straight line length=about 450 mm) in the widthwise direction by the rotated noodle cutter 52 and folded by the folding member (not shown) into two, to form folded noodle groups 63. The path of the noodle groups 63 is then selected to the right and left by the selector conveyor 54 having the selector mechanism 53 and conveyed to the vertical dryer 55 by the conveyor 56. The noodle groups 63 conveyed to the dryer 55 are sequentially turned and dried by the multistage net conveyor 57. A series of seven dry noodle groups 64 adhered by the noodle dividing sections are separated at their division portions to manufacture dry noodles (not shown). Thereafter, the dry noodles are conveyed to a packing step by a conveyor or the like and packed.

The dry noodles manufactured and packed in Example 2 are a block of a plurality of noodles having a length of about 450 mm. Each noodle has a plurality of indented portions having a remaining noodle thickness of about 0.5 mm at intervals of about 90 mm. These dry noodles were put into a cooking pot containing boiling soup and cooked for several minutes (e.g., five minutes). As a result, all the noodles separated at the indented portions into short noodles having a length of 90 mm and therefore could be served with a spoon or fork with which uncomfortable sipping noise may not be made upon eating unlike in the case of chopsticks. In addition, the packed dry noodles had the same shape retaining property as that of conventional packed dry noodles (a block of noodles having a length of about 450 mm), and no deformation which degrades the commercial value and the like occurred.

In the process illustrated in FIG. 7, when the noodle strip 58 is supplied to and cut by the cutter rolls 45a and 45b located below the indented portion forming means 44 after the indented portions (not shown) are formed on the strip 58 by the means 44, a tensile force is applied on the strip 58. However, the strip 58 did not separate at the indented portions by this tensile force but was linearly cut by the cutter rolls 45a and 45b, thereby continuously forming the noodles 59.

In addition, according to the manufacturing apparatus shown in FIGS. 7 and 8, without largely changing the design of a conventional manufacturing installation, the dry noodles can be manufactured by only adding the indented portion forming means 44 before the cutter rolls 45a and 45b for linearly cutting the strip 58 into the noodles 59.

In the above embodiments, the indented portion forming means having a pair of rolls, one of which has a rib formed on its outer surface so as to form a curve from the central portion toward both the ends of the roll in a direction opposite to the rotation direction of the roll, is used to form the indented portion in the widthwise direction of the strip. The present invention, however, is not limited to the above embodiments. For example, a indented portion forming means comprising a roll and an urging plate, capable of moving forward-/backward along the rolls from obliquely above the roll, and having a tapered distal end may be used such that the urging plate is urged against the strip fed along the roll to form the indented portions.

As has been described above, according to the present invention, there can be provided instant noodles which can easily separate, at the indented portions formed on the noodles, into short noodles upon cooking with boiling water, or the like, in a cooking pot so as to be served with a spoon or fork with which an uncomfortable sipping noise may not be made and has a good shape retaining property when it is packed and displayed, a method capable of manufacturing the instant noodles in a massproduction manner with simple steps, without greatly changing conventional manufacturing steps, and an apparatus capable of easily manufacturing the instant noodles in a massproduction manner without largely changing the design of a conventional manufacturing installation.

What is claimed is:

1. An apparatus for manufacturing instant noodles, comprising:
    means for forming dough into a strip;
    indented portion forming means comprising a pair of rolls between which strip travels, and a rib formed on an outer surface of one of said rolls so as to form a curve from a central portion of said one roll toward both ends of said one roll in a direction opposite to a rotation direction of said one roll, said indented portion forming means forming a plurality of widthwise indented portions on said strip at an interval in a longitudinal direction of said strip, as said strip passes between said pair of rolls;
    means for linearly cutting said strip having said plurality of indented portions therein, in the direction of travel of said strip, to form raw noodles;
    means for dividing said raw noodles into a plurality of rows in the direction of travel of said noodles, and waving said raw noodles so that said raw noodles vertically overlap each other;
    means for steaming groups of the overlapped waved raw noodles; and
    means for cutting the steamed raw noodle groups to a desired length.

* * * * *